G. Z. DYER.
CONVERTIBLE VEHICLE BODY.
APPLICATION FILED APR. 12, 1916.
1,385,317.
Patented July 19, 1921.
2 SHEETS—SHEET 1.
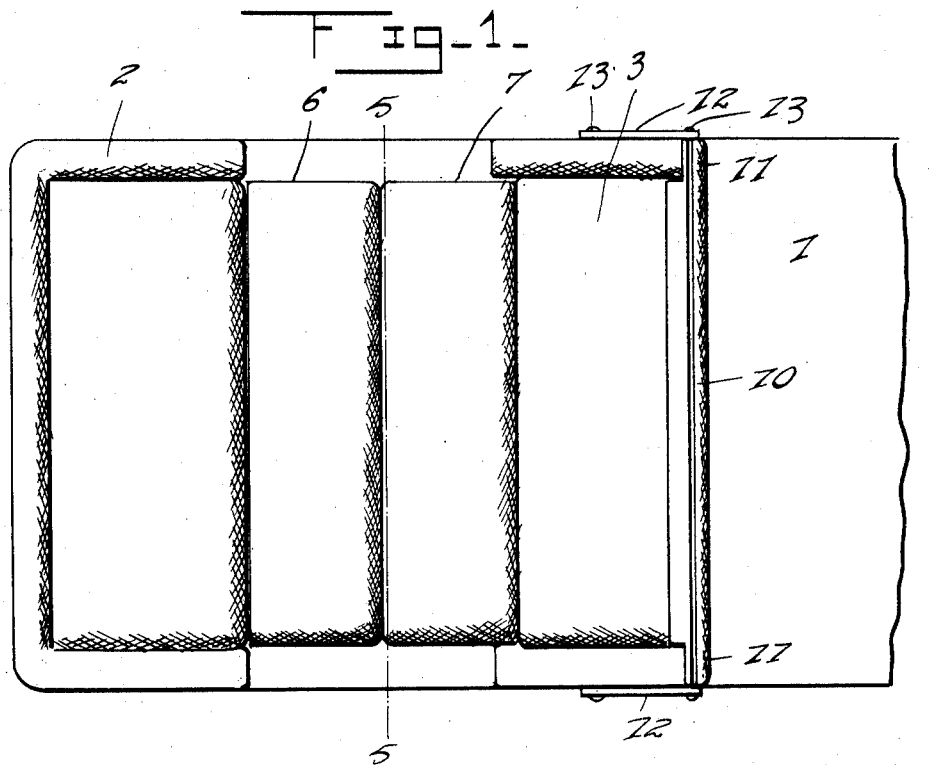
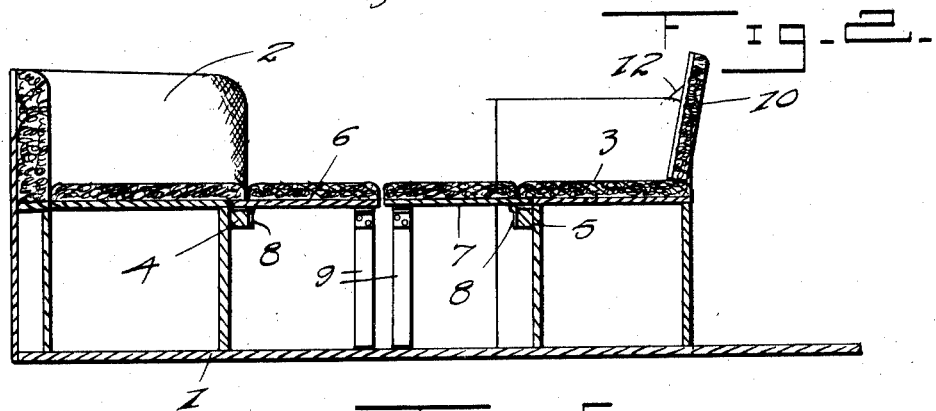
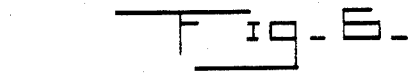
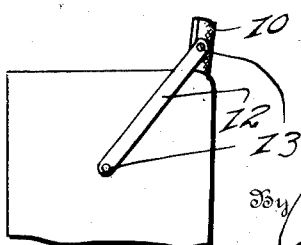
Witnesses
Inventor
G. Z. Dyer.
Attorney G. Z. DYER.
CONVERTIBLE VEHICLE BODY.
APPLICATION FILED APR. 12, 1916.
1,385,317.
Patented July 19, 1921.
2 SHEETS—SHEET 2.
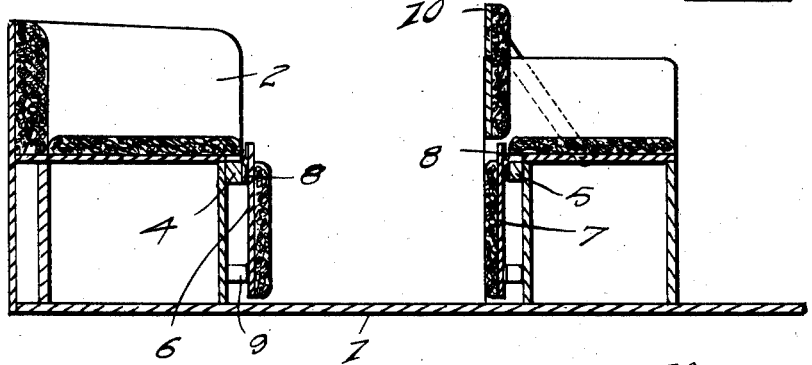
Fig-3-
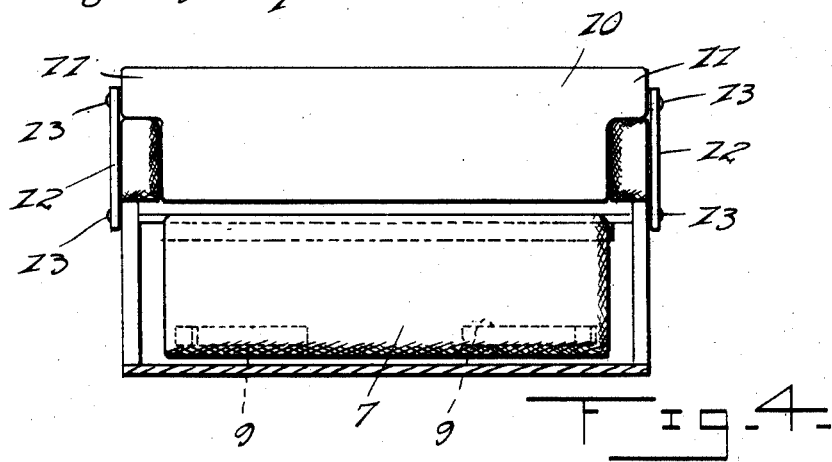
Fig-4-
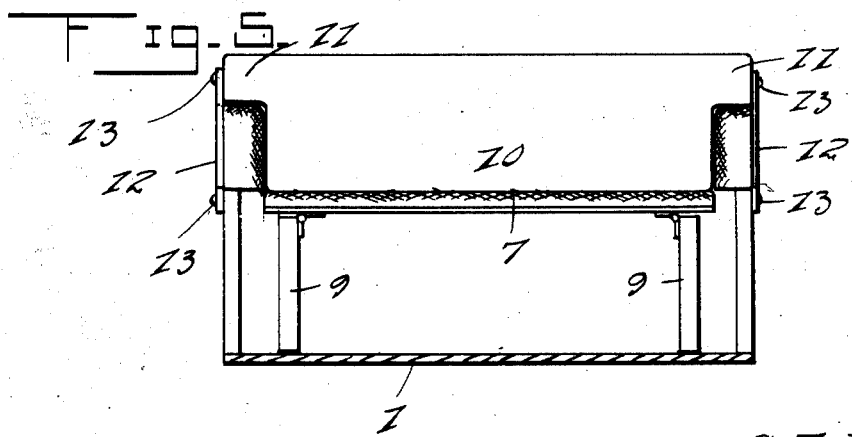
Fig-5-
Witnesses
C. R. Beall.
James J. Dwyer.
Inventor
G. Z. Dyer.
By
Attorney

UNITED STATES PATENT OFFICE.

GON Z. DYER, OF WILLIAMSON, WEST VIRGINIA.

CONVERTIBLE VEHICLE-BODY.

1,385,317.   Specification of Letters Patent.   Patented July 19, 1921.

Application filed April 12, 1916. Serial No. 90,737.

*To all whom it may concern:*

Be it known that I, GON Z. DYER, a citizen of the United States, residing at Williamson, in the county of Mingo and State of West Virginia, have invented certain new and useful Improvements in Convertible Vehicle-Bodies; and I do hereby declare the following to be a full, clear, and exact description of the invention, such as will enable others skilled in the art to which it appertains to make and use the same.

This invention relates to improvements in convertible vehicle bodies of the type having a front and rear seat, and foldable extensions located within the body and adapted when moved to unfolded position to provide a couch, one object of the invention being to increase the supporting means for the extensions when in couch formation, so as to prevent accidental collapse of the extensions; also to relieve the fastening means which connect the extensions to the vehicle body, from strain when the extensions are in operative position.

Another object of the invention is to provide a novel type of seat back for the front seat of the vehicle, which can be moved to provide an end board for the couch when the extensions are in couch formation.

Other objects will appear and be better understood from that embodiment of my invention of which the following is a specification, reference being had to the accompanying drawings forming a part thereof in which,—

Figure 1 is a top plan view of the vehicle body with the extensions moved to couch formation, Fig. 2 is a longitudinal sectional view taken through Fig. 1, Fig. 3 is a longitudinal sectional view taken through the vehicle body with the extensions moved to inoperative position, Fig. 4 is a transverse section taken through the vehicle body and showing the rear side of the front seat back and also showing one of the extensions moved to inoperative position, Fig. 5 is a transverse section taken on the line 5—5 of Fig. 1, and Fig. 6 is a detail view of the front seat back and the support therefor, and showing the manner of connecting the seat back to the support.

Referring to the drawings more in detail, the numeral 1 designates a vehicle body provided with the usual rear seat 2 and front seat 3. The rear seat 2 is provided with a longitudinal strip 4, which is located at a point below the forward edge of the seat and secured thereto in any suitable manner, and a similar longitudinal strip 5 extends along the rear side of the front seat 3 and is located at a point below the upper portion of the seat 3 and secured in place in any suitable manner. Hingedly connected to the strips 4 and 5 are extensions 6 and 7. The hinges which connect the extensions 6 and 7 to the respective strips 4 and 5 are shown at 8, and are of the leaf hinge type having one leaf thereof secured to the outer side of the adjacent longitudinal strip and the other leaf secured to the under side of the adjacent extension, as shown more particularly in Figs. 2 and 4 of the drawings. When the extensions 6 and 7 are in raised position, those edges which have the hinges 8 connected thereto overlie the upper sides of the strips 4 and 5 so that the fastening elements for the hinges will be relieved from strain. The under sides of the extensions 6 and 7 have hinged thereto adjacent the free edges of the extensions 6 and 7, folded supporting legs 9 which, when the extensions are in couch formation as shown in Figs. 1 and 2 of the drawings, extend vertically and support the forward free edges of the extensions 6 and 7, and when the extensions are in folded position as shown in Fig. 3 the supporting legs 9 are folded against the inner sides of the extensions, so as to admit of the extensions being positioned in close proximity to the respective seats 2 and 3.

The front seat 3 is provided with an adjustable seat back 10, the said seat back 10 having its opposite ends provided with extensions 11 which engage over the arm rests for the front seat 3 and the said extensions 11 have connection with the sides of the seat by means of the links 12 which are pivotally connected to the extensions 11 and the sides of the seat 3 by means of the pivot pins 13. When the extensions 6 and 7 are raised to couch formation the seat back 10 is moved forward to the position shown in Figs. 1 and 2 of the drawings, and positioned at the forward edge of the seat 3 and provides an end board for the couch.

Having thus described my invention, what I claim is:—

A convertible automobile body comprising front and rear seats each including back and seat portions and the back portion of the rear seat being rigidly secured to the seat portions of said rear seat, links pivoting the back portion of the front seat to the seat portion thereof so that said last mentioned back portion may be moved from the rear edge to the front edge of the seat portion of the front seat, strips secured to the front and rear seats along their rear and front edges respectively, extensions of widths equal to the width of the seat portion hinged to said strips and adapted to be moved into a plane with the seat portion with their attached edges overlying the strips, and links hinged to said extensions for supporting them in said position.

In testimony whereof I affix my signature in presence of two witnesses.

GON Z. DYER.

Witnesses:
J. S. WYRICK,
CHAS. F. HIGGINS.